United States Patent [19]

Wada et al.

[11] Patent Number: 5,550,648
[45] Date of Patent: Aug. 27, 1996

[54] SYSTEM FOR FILLING OUTLINES BY ADDITION AND SUBTRACTION ACCORDING TO START AND END POSITIONS OF THE OUTLINES

[75] Inventors: Koji Wada; Kouichi Sato, both of Tokyo, Japan

[73] Assignee: NEC Corporation, Tokyo, Japan

[21] Appl. No.: 358,374

[22] Filed: Dec. 19, 1994

[30] Foreign Application Priority Data

Dec. 20, 1993 [JP] Japan .................................. 5-318811

[51] Int. Cl.⁶ ............................................. H04N 1/21
[52] U.S. Cl. ........................................ 358/448; 358/447
[58] Field of Search .................................. 382/193, 199; 358/447–448, 296, 298

[56] References Cited

U.S. PATENT DOCUMENTS 5,041,848 8/1991 Gilbert et al. ......................... 346/108
5,212,559 5/1993 Gilbert et al. ......................... 358/298

FOREIGN PATENT DOCUMENTS 1164992 6/1989 Japan ............................... G09G 1/00

Primary Examiner—Stephen Brinich
Attorney, Agent, or Firm—Sughrue, Mion, Zinn, Macpeak & Seas

[57] ABSTRACT

An image outline filling system comprises an image outline memory for storing start positions and end positions of image outlines, and a controllable arithmetic circuit which changes its output status in a positive direction at a start position of the image outlines and changes the output status in a negative direction at a end position of the image outlines. By filling a region in which the output status has a value of the positive direction, the image outline whose inside is filled is obtained.

11 Claims, 7 Drawing Sheets

◯ : START POSITION
◎ : END POSITION

OUTLINE START POSITION MEMORY 102

OUTLINE END POSITION MEMORY 103

SYSTEM FOR FILLING OUTLINES BY ADDITION AND SUBTRACTION ACCORDING TO START AND END POSITIONS OF THE OUTLINES

BACKGROUND OF THE INVENTION

1. Field of the Invention

The present invention relates to an image processing system and, more particularly, to an image processing system for filling the inside of an image outline that is synthesized from a plurality of outlines.

2. Description of the Related Art

A method for synthesizing a plurality of image outlines and filling the inside thereof is disclosed in Japanese Patent Laid-open No. 1-164992. In this method, individual image outlines are filled and then the filled images are synthesized. As shown in FIG. 1, two image outlines generated by an outline generator 1 are stored in work memories 2 and 3, respectively. The insides of the two image outlines stored in the work memories 2 and 3 are filled under the control of a transfer controller 4 by filling circuits 5 and 6, respectively, and the filled image outlines are then transferred through an OR circuit 7 to a bit map memory 8.

An example of the concrete operation of the above-described method is shown in FIG. 2. Two image Outlines are stored in the work memories 2 and 3, and the insides thereof are filled by the filling circuits 5 and 6, respectively. The filled image outlines are overlapped by the OR circuit 7 and stored in the bit map memory 8.

However, in the above-described method, if the number of image outlines to be synthesized is increased, it will be necessary to provide the work memories and the filling circuits corresponding in number to the image outlines. The conventional method therefore has the disadvantage that the scale of the circuitry will be increased extremely if a large number of image outlines is synthesized.

SUMMARY OF THE INVENTION

Accordingly, it is an object of the present invention to provide a filling system which makes it possible to fill any image outline with small-scale circuitry.

Another object of the present invention is to provide a filling system which makes it possible to fill a synthesized image outline with small-scale circuitry independent of the number of image outlines to be synthesized.

To achieve the above objects, there is provided according to the present invention an image outline filling system which comprises an image outline memory for storing start positions and end positions of an image outline, and a controllable arithmetic circuit which is capable of changing its output status on a scanning line in a positive or a negative direction. The controllable arithmetic circuit changes its output status at a line start position of the image outline in the positive direction and changes the output status at a line end position in the negative direction. In other words, even if the image outlines were synthesized from many outlines, the number of syntheses would be expressed as an output status of the controllable arithmetic circuit. By filling a scanning line region in which the output status of the controllable arithmetic circuit has a value in the positive direction, there can be obtained an image outline whose inside is filled.

It is preferable that the image outline memory comprises a start outline memory for storing line start positions of the image outline, and an end outline memory for storing end positions of the same image outline.

The controllable arithmetic circuit may comprise an adder-subtracter for performing addition operations at line start positions and subtraction operations at line end positions. Preferably, a plurality of adder-subtracters and a single latch circuit are connected in series, and the output status of the controllable arithmetic circuit can be expressed by the output values of the respective adder-subtracters. In this configuration, a scanning line is processed by repeatedly operating the adder-subtracters through the latch circuit. It is therefore preferable that the number of data bits on a scanning line be a multiple of the number of adder-subtracters.

BRIEF DESCRIPTION OF THE DRAWINGS

The above and other objects and advantages will become apparent from the following detailed description when read in conjunction with the accompanying drawings wherein.

DETAILED DESCRIPTION OF THE PREFERRED EMBODIMENT

Figure 1:
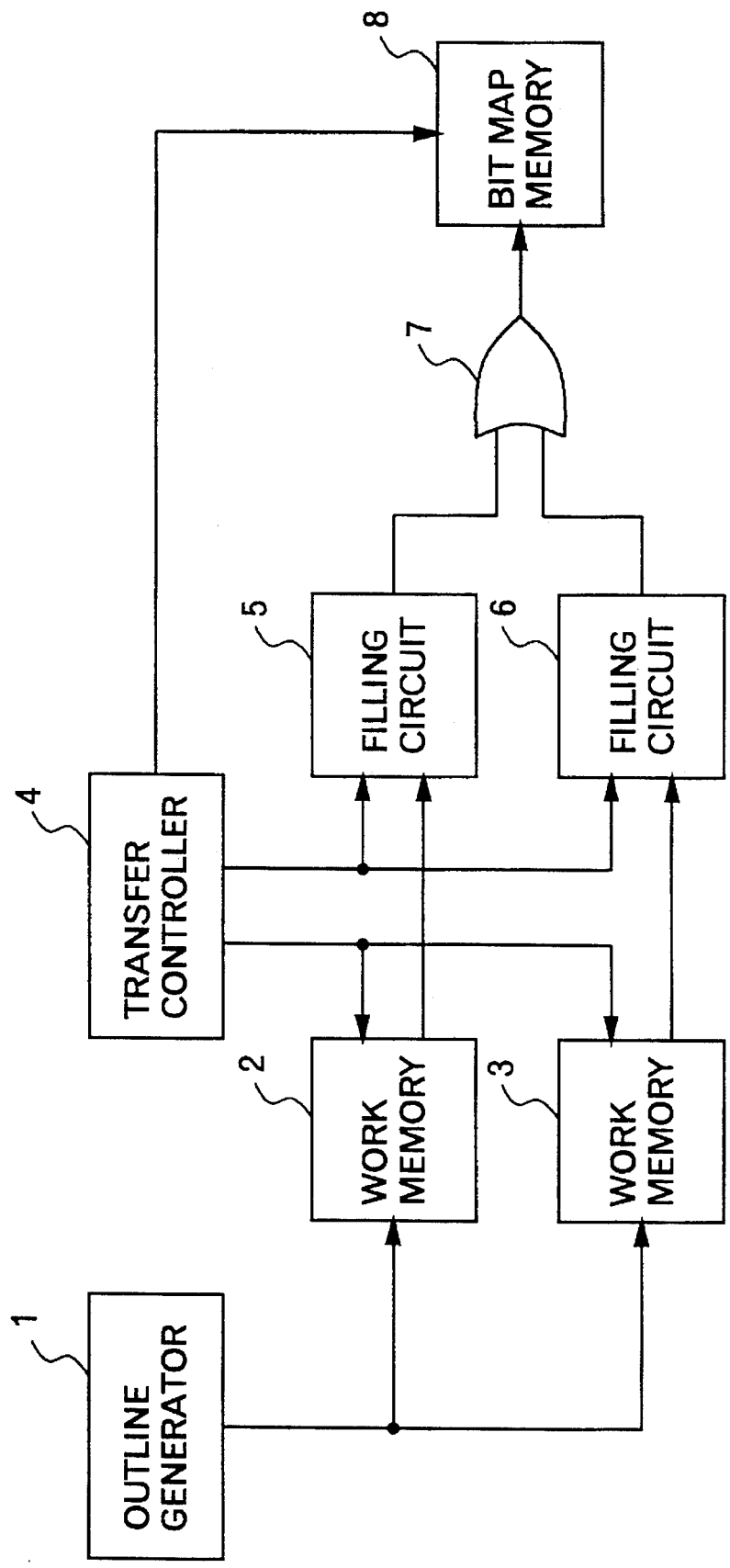
FIG. 1 is a block diagram view showing a conventional outline filling system.
Figure 2:
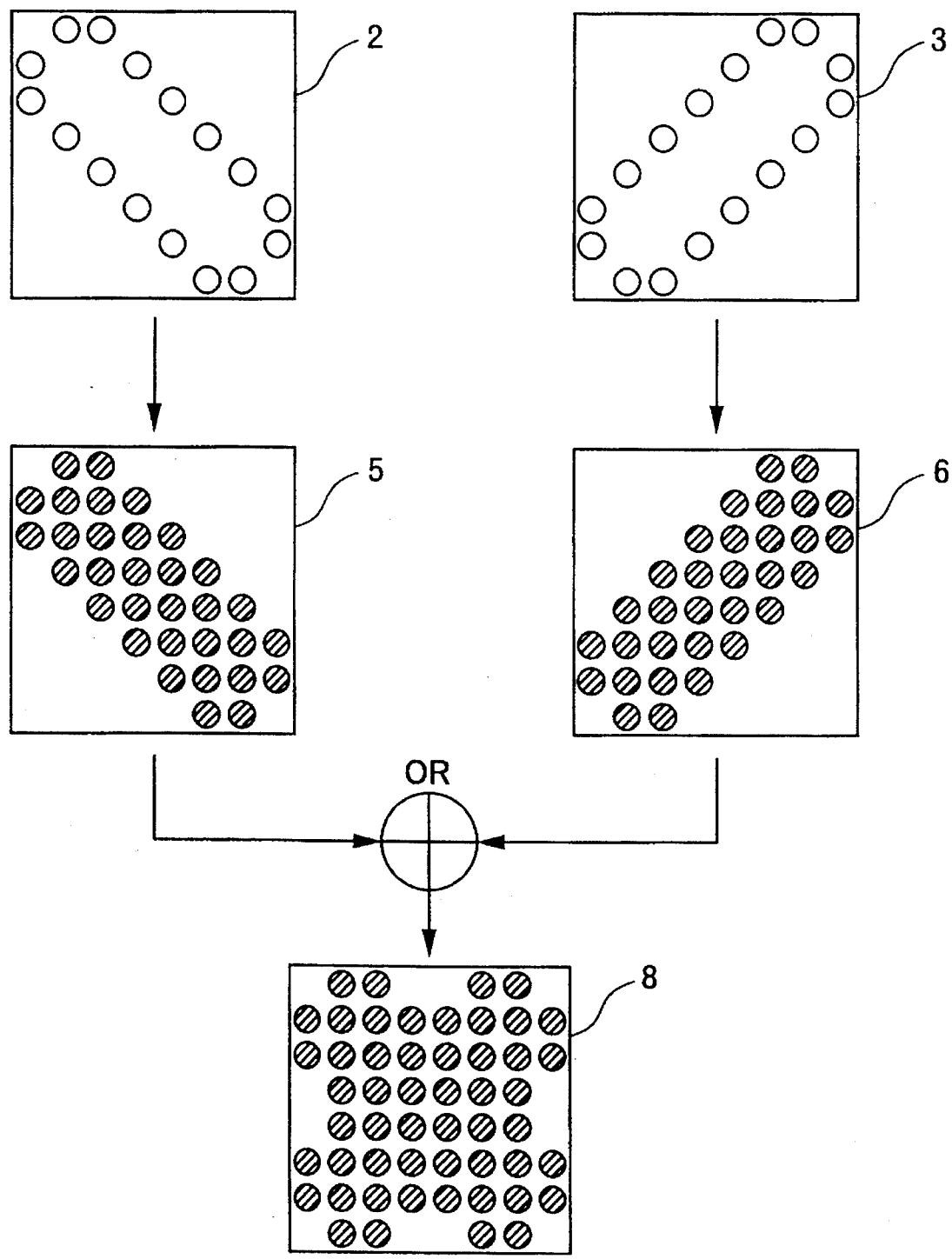
FIG. 2 is a flowchart showing a conventional outline filling method which is carried out by the system of FIG. 1.
Figure 3:
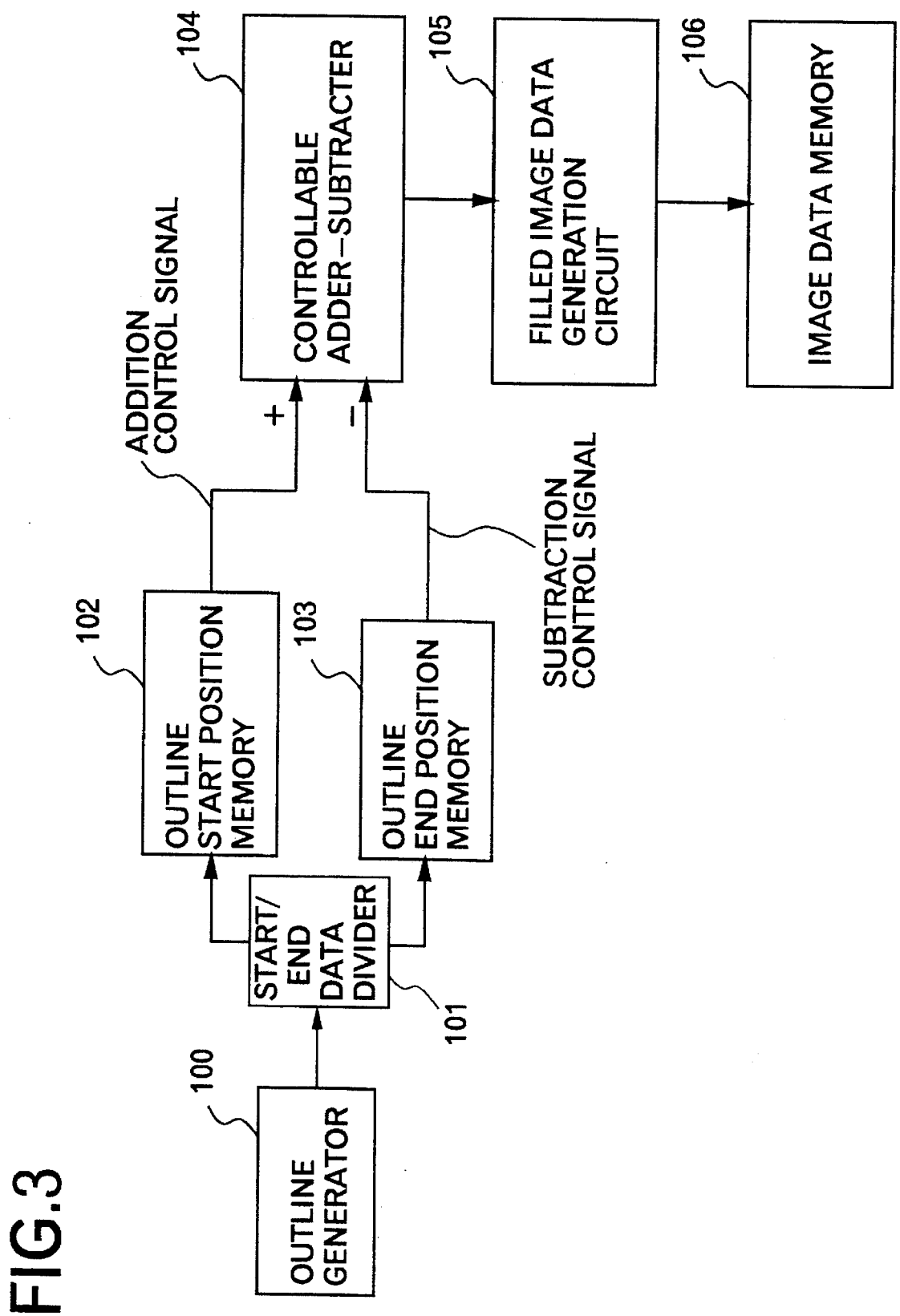
FIG. 3 is a block diagram showing an embodiment of an outline filling system according to the present invention.

Referring to FIG. 3, there is shown a preferred embodiment of a filling system in accordance with the present invention. Outline coordinate data generated by an outline generator 100 is divided into outline start position data and outline end position data by a start/end data divider 101. The outline start position data and the outline end position data are stored in the form of a line data into an outline start position memory 102 and an outline end position memory 103, respectively. The start/end data divider 101 discriminates between the outline start position data and the outline end position data, depending on which a differential value of the outline coordinate data is positive or negative.

A controllable adder-subtracter 104 receives an addition control signal and a subtraction control signal from the outline start position memory 102 and the outline end position memory 103, respectively. The addition control signal is comprised of the outline start position data and the subtraction control signal is comprised of the outline end position data. Receiving these control signals, the controllable adder-subtracter 104 performs an addition operation when the addition control signal indicative of an outline start position is input and performs a subtraction operation when the subtraction control signal indicative of an outline end position is input. Through these addition and subtraction operations, the controllable adder-subtracter 104 outputs a value of 1 or more in the region between the first outline start position and the last outline end position of a certain scanning line and outputs a value of 0 at positions other than that region. A filled image data generation circuit 105 receives the output value of the controllable adder-subtracter 104 for each scanning line and fills regions having a value of 1 or more. All of the filled regions are replaced, for example, by '1', and output to an image data memory 106. The image data memory 106 stores therein the filled line data in sequence and forms bit map image data.

Figure 4:
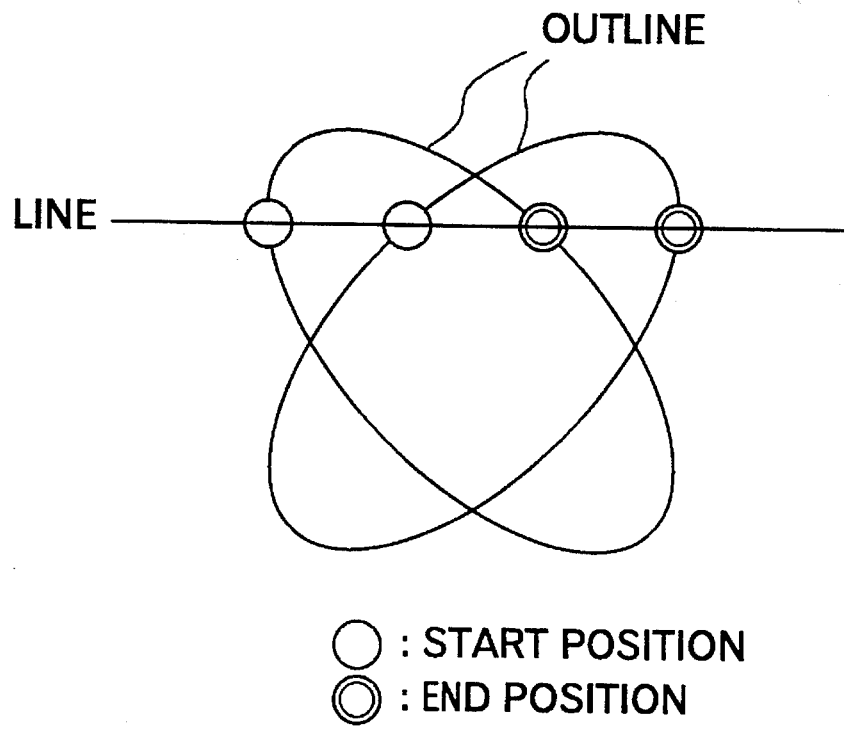
FIG. 4 is a schematic view showing a synthesized image outline used to explain the operation of the embodiment of the present invention.

FIG. 4 illustrates a case in which the outline generator 100 generates the outline coordinate data in which two outlines are synthesized. Since, as shown in the figure, a start position and an end position of each image outline exist on a certain scanning line, two start positions and two end positions are stored in the outline start position memory 102 and the outline end position memory 103, respectively. Note that the outline coordinate data is divided by the start/end data divider 101 such that the number of start positions is always equal to the number of end positions on any line. Such start position data and end position data are output in scanning lines to the controllable adder-subtracter 104 as addition and subtraction parameters.

Figure 5:
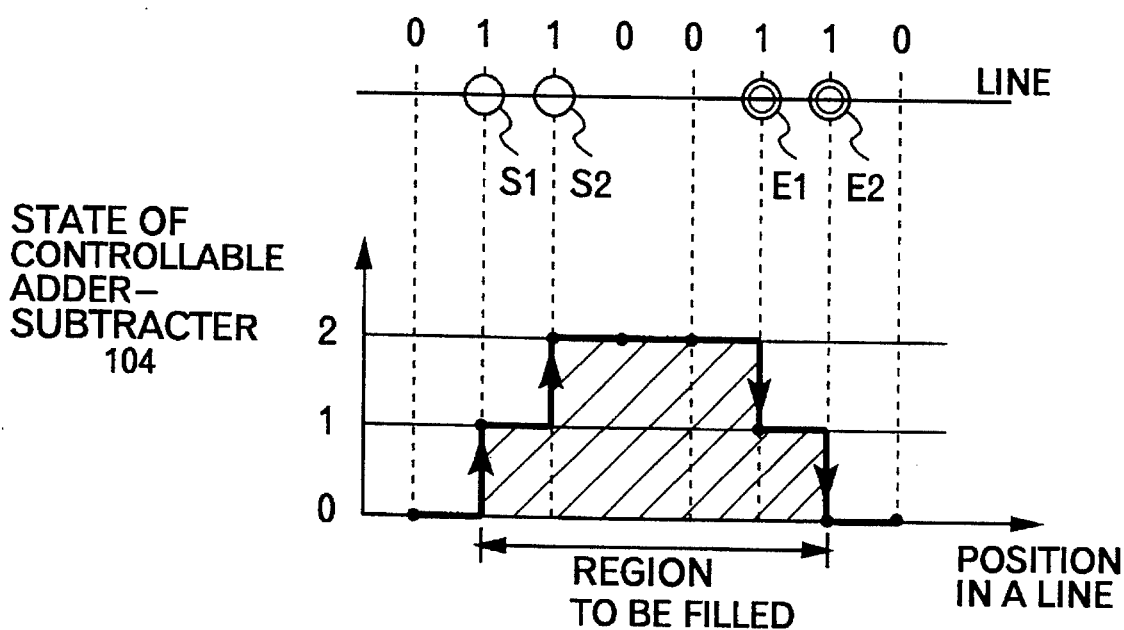
FIG. 5 is a graph showing how the output status of the controllable adder-subtracter is changed in the present embodiment.

As shown in FIG. 5, the output status of the controllable adder-subtracter 104 is increased by one unit each time bit data '1' indicative of a start position is input, and is decreased by one unit each time bit data '1' indicative of an end position is input. Therefore, the output value of the controllable adder-subtracter 104 is incremented from "0" to "1" by the first start position S1 and further incremented by the next start position S2, and the output value goes to "2". The output value is decremented by the first end position E1 and is returned to "0" by the last end position E2. The region having output values of 1 or more is therefore formed on the scanning line between the first start position S1 and the last end position E2, and the region are to be filled.

The above-described operation of the controllable adder-subtracter 104 is applicable not only to the synthesis of two image outlines but also to the synthesis of an arbitrary number of image outlines. More particularly, since the number of start positions (also end positions) is equal to that of synthesized image outlines, an output value of the controllable adder-subtracter 104 is incremented each time a start position is input and decremented each time an end position is input, and, finally, the output value is returned to "0". Therefore, only the inside positions of the outermost outline of a synthesized outline have an output value of 1 or more, and such a region is to be filled.

The controllable adder-subtracter 104 may be comprised of a single controllable adder-subtracter and can also be comprised of a plurality of controllable adder-subtracters which are connected in series. The number of data bits of any scanning line is a multiple of the number of the controllable adder-subtracters. Note that since, in the case of a plurality of controllable adder-subtracters, the addition and subtraction operations are required repeatedly to cover all of the data bits of one line, a latch circuit is further required to be connected to the controllable adder-subtracters in series.

A circuit construction in which a frame of image data is 8 bits×8 lines and four controllable adder-subtracters are used will hereinafter be described as a concrete example of this embodiment to make the description simpler.

Figure 6:
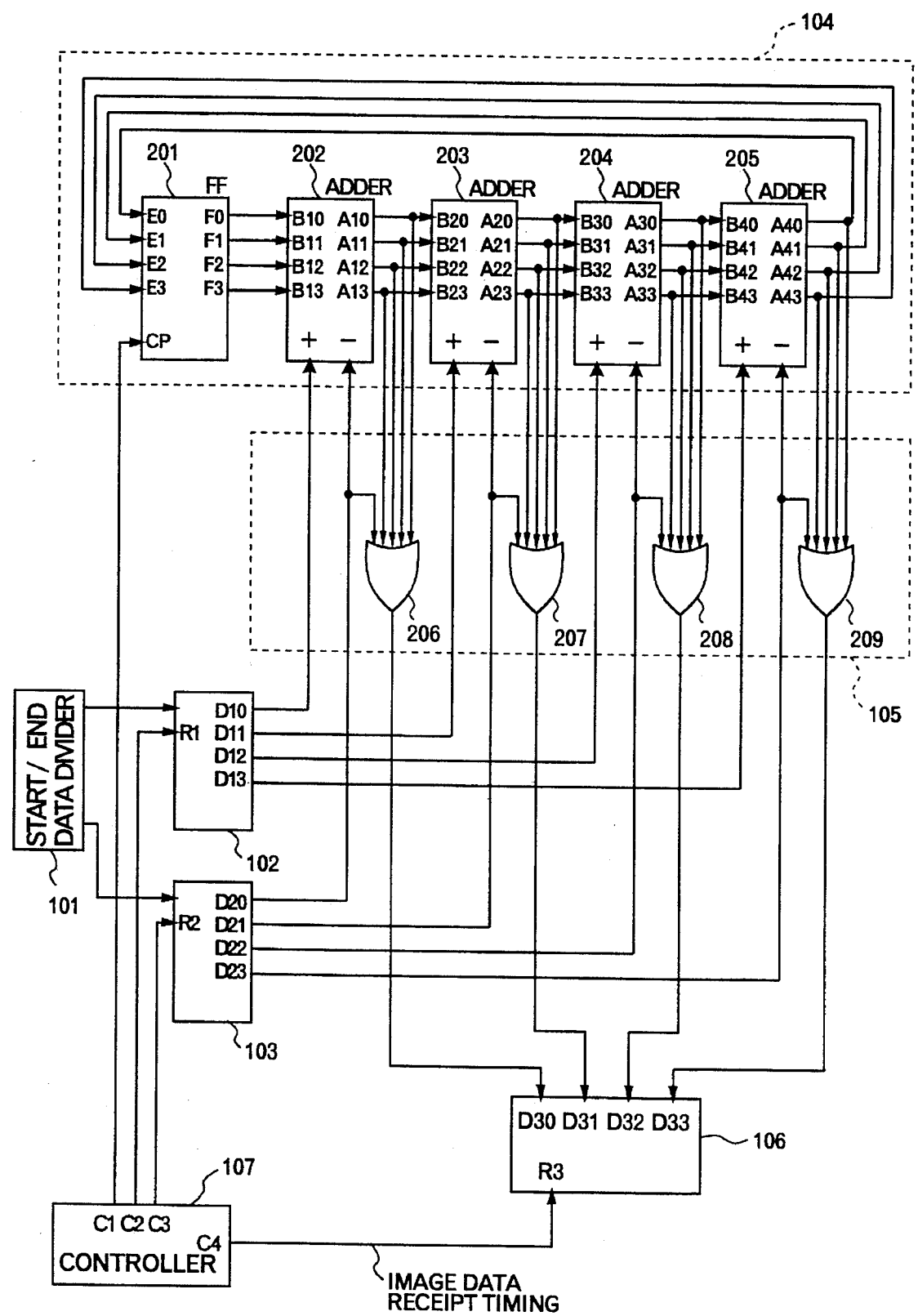
FIG. 6 is a detailed block diagram of the present embodiment.

As shown in FIG. 6, the controllable adder-subtracter 104 comprises a single latch circuit 201 and four controllable adders 202 to 205. The latch circuit 201 comprises a flip-flop, and output terminals F0 to F3 are connected to input terminals B10 to B13 of the adder 202, respectively. The adders 202 to 205 are likewise connected in series. Output terminals A40 to A43 of the last adder 205 are connected to input terminals E0 to E3 of the latch circuit 201, respectively.

Output terminals D10 to D13 of the outline start position memory 102 are connected to the addition control terminals of the adders 202 to 205, respectively, and output terminals D20 to D23 of the outline end position memory 103 are connected to the subtraction control terminals of the adders 202 to 205, respectively.

The filled image data generation circuit 105 comprises OR gates 206 to 209. Output terminals A10 to A13 of the adder 202 are connected to the input terminals of the OR gate 206, respectively. Likewise, the output terminals of the adders 203 to 205 are connected to the input terminals of the OR gates 207 to 209, respectively. Also, the respective output terminals D20 to D23 of the outline end position memory 103 are connected to the input terminals of the OR gates 206 to 209. The output terminals of the OR gates 206 to 209 are connected to input terminals D30 to D33 of the image data memory 106, respectively.

A controller 107 outputs latch control signal C1 to the latch circuit 201, data read control signal C2 to the outline start position memory 102, data read control signal C3 to the outline end position memory 103, and image data write control signal C4 to the image data memory 106.

Operation

Figure 7A:
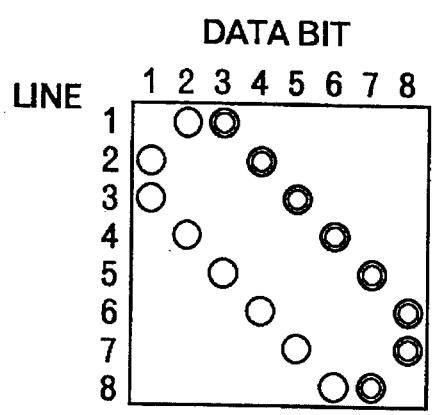
FIGS. 7A and 7B are schematic bit map diagrams showing two image outlines generated by the outline generator of the present embodiment.
Figure 7B:
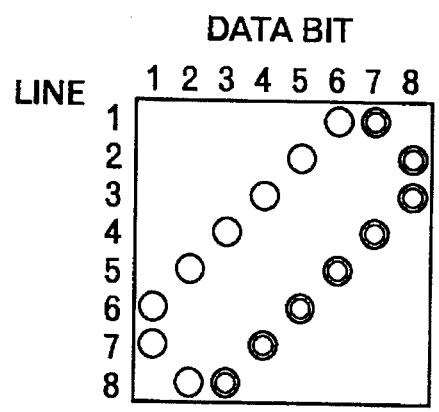
Figure 7C:
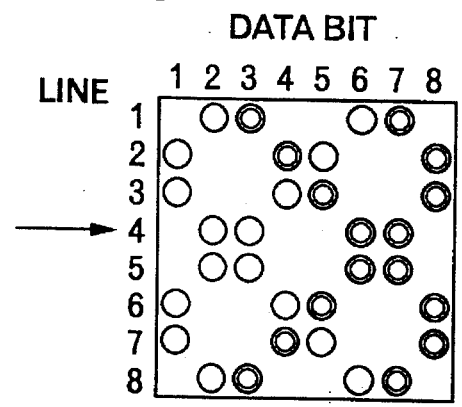
FIG. 7C is a schematic bit map diagram showing the bit map state in which the two image outlines in FIGS. 7A and 7B are synthesized.
Figure 8A:
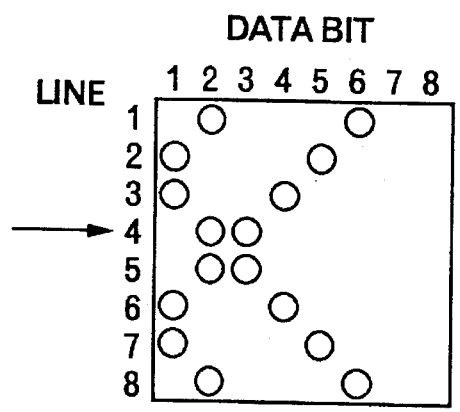
FIG. 8A is a schematic bit map diagram showing the start position of a synthesized image outline stored in the outline start position memory of the present embodiment.
Figure 8B:
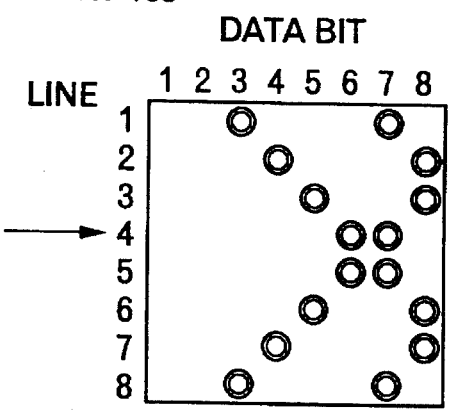
FIG. 8B is a schematic bit map diagram showing the end position of a synthesized image outline stored in the outline end position memory of the present embodiment.

An operation in a case where the two image outlines shown in FIGS. 7A and 7B are synthesized as shown in FIG. 7C will be described. Among the image outline coordinate data generated by the outline generator 101, the outline start position data is stored in the outline start position memory 102, as shown in FIG. 8A, and the outline end position data is stored in the outline end position memory 103, as shown in FIG. 8B. For 4th line of the outline data shown in FIGS. 8A and 8B, the filling operation of this embodiment will hereinafter be described with reference to FIG. 9.

Figure 9:
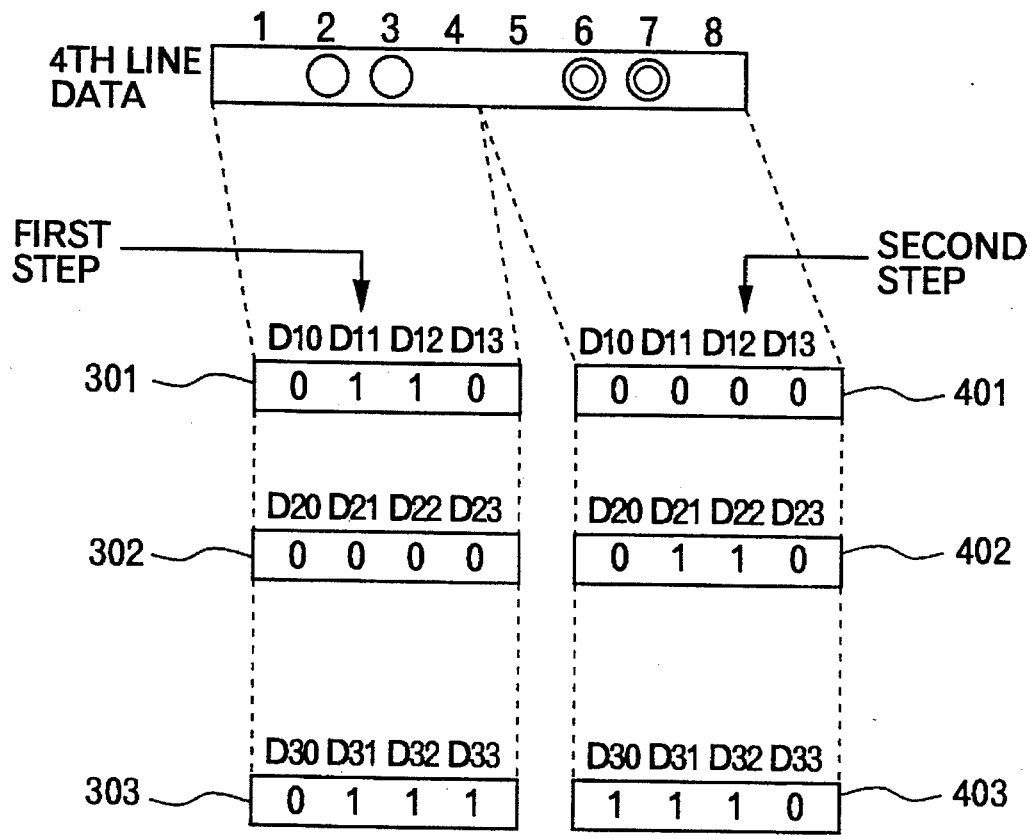
FIG. 9 is a data bit state diagram showing a data processing operation of the present embodiment.

First Step:

First, the controller 107 outputs the respective read control signals C2 and C3 to the outline start position memory 102 and the outline end position memory 103. This causes the outline start position memory 102 and the outline end position memory 103 to output the respective line data 301 and 302 (in this example, of the fourth line) to the controllable adder-subtracter 104. As shown in FIG. 9, the line data 301 of '0110' is output from the output terminals D10 to D13 of the outline start position memory 102, and the line data 302 of '0000' is output from the output terminals D20–D23 of the outline end position memory 103.

Since an initial output value of the latch circuit 201 is "0" 4-bit data '0000' is input to the input terminals B10 - B13 of the adder 202. A first bit data '0' of the line data 301 is output from the output terminal D10 of the outline start position memory 102 to the addition control terminal of the adder 202, and a first bit data '0' of the line data 302 is output from the output terminal D20 of the outline end position memory 103 to the subtraction control terminal of the adder 202. Therefore, the adder 202 does not perform any addition or subtraction operation, outputting 4-bit data '0000' from the output terminals A10–A13 and, consequently, the OR gate 206 will output a bit data '0'.

Similarly, since the adder 203 receives 4-bit data '0000' from the adder 202, a bit data '1' of D11 at the addition control terminal, and a bit data '0' of D21 at the subtraction control terminal, the adder 203 performs the addition operation and outputs 4-bit data '0001', or decimal numeral "1", from the output terminals A20–A23. Therefore, the OR gate 207 will output a bit data '1'. Since the adder 204 receives decimal numeral "1" from the adder 203, a bit data '1' of D12 at the addition control terminal, and a bit data '0' at the subtraction control terminal, the addition operation is performed to output 4-bit data '0010', i.e. , decimal numeral "2", from the output terminals A30–A33. Therefore, the OR gate 208 will output a bit data '1'. Finally, since the adder 205 receives a decimal numeral "2" from the adder 204, a bit data '0' of D13 at the addition control terminal, and a bit data '0' of D23 at the subtraction control terminal, the adder 205 does not perform any addition or subtraction operation, therefore outputs 4-bit data '0010', i.e., decimal numeral "2", from the output terminals A40–A43. Therefore, the OR gate 209 will output a bit data '1'.

In this way, the respective output bits of the OR gates 206 to 209 are '0', '1', '1', and '1' and output as filled image data 303 to the input terminals D30 to D33 of the image data memory 106. The filling operation for the first half of the 4th line data is completed.

Second Step:

Subsequently, the controller 107 outputs the latch control signal C1 to the latch circuit 201 so that the output '0010' of the adder 205 is latched. The controller 107 further outputs the read control signals C2 and C3 to the outline start position memory 102 and the outline end position memory 103. In response to these signals C2 and C3, the respective memories 102 and 103 output the remaining line data 401 and 402 to the controllable adder-subtracter 104.

Since the current output value of the latch circuit 201 is '0010', or decimal numeral "2", the adder 202 receives the output data '0010' at the input terminals B10–B13. A first bit data '0' of the line data 401 is output from the output terminal D10 of the outline start position memory 102 to the addition control terminal of the adder 202, and a first bit data '0' of the line data 402 is output from the output terminal D20 of the outline end position memory 103 to the subtraction control terminal of the adder 202. Therefore, the adder 202 does not perform any addition or subtraction operation, outputting 4-bit data '0010' from the output terminals A10–A13 and, consequently, the OR gate 206 will output a bit data '1'.

Similarly, since the adder 203 receives the 4-bit data '0010' from the adder 202, a bit data '0' of D11 at the addition control terminal, and a bit data '1' of D21 at the subtraction control terminal, the adder 203 performs the subtraction operation and outputs 4-bit data '0001', or decimal numeral "1" from the output terminals A20–A23. Therefore, the OR gate 207 will output a bit data '1'. Since the adder 204 receives decimal numeral "1" from the adder 203, a bit data '0' of D12 at the addition control terminal, and a bit data '1' of D22 at the subtraction control terminal, the subtraction operation is performed to output 4-bit data '0000', i.e., decimal numeral "0", from the output terminals A30–A33. However, since the OR gate 208 receives bit data '1' from the terminal D22 of the end position memory 103, the output of the OR gate 208 is '1'. Finally, since the adder 205 receives a decimal numeral "0" from the adder 204, bit data '0' of D13 at the addition control terminal, and bit data '0' of D23 at the subtraction control terminal, the adder 205 does not perform any addition or subtraction operation, therefore outputs the 4-bit data '0000', i.e., decimal numeral "0" from the output terminals A40–A43 Since the OR gate 209 inputs bit data "0" from the terminal D23 of the end position memory 103, the OR gate 209 outputs bit data '0'.

In this way, the respective output bits of the OR gates 206 to 209 are '1', '1', '1' and '0' and output as filled image data 403 to the input terminals D30 to D33 of the image data memory 106. The filling operation for the second half of the 4th line data is completed.

Figure 10:
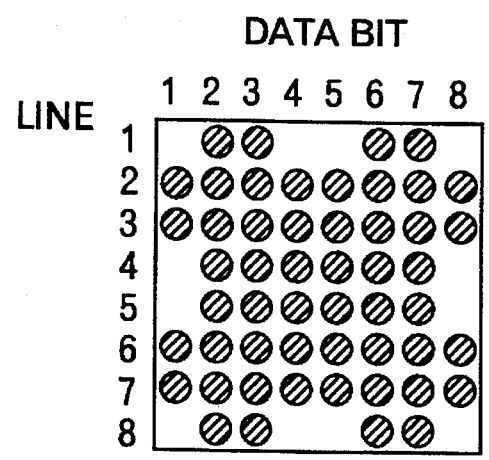
FIG. 10 is a bit map diagram of a synthesized outline filled by the present embodiment.

Through the above-described first and second steps, the filling operation of the 4th line data is performed to fill the region from the first outline start position (the 2nd data bit) to the last outline end position (the 7th data bit). The above-described filling operation is repeated from the 1st line to the 8th line so that the entire inside of the synthesized outline will be filled as shown in FIG. 10.

Although only one embodiment of the present invention has been described herein, it will be apparent to those skilled in the art that the present invention may be embodied in many other specific forms without departing from the spirit or scope of the invention. For example, even if a frame of image data is comprised of 100 bits×100 lines, it would be apparent that the filling operation can be executed with the same configuration as in FIG. 6. In addition, although, in this embodiment, two image outlines have been synthesized, the present invention is not limited to this. Even if a number of image outlines were synthesized, the filling operation would be executed in the same way as in FIG. 6.

What is claimed is:

1. An image signal processing system for filling the insides of image outlines, comprising:

controllable arithmetic means capable of changing its output status in either of a positive direction and a negative direction, the controllable arithmetic means changing the output status in one direction when a scanning position is coincident with a start position of the image outlines and changing the output status in the opposite direction when the scanning position is coincident with an end position of the image outlines, said controllable arithmetic means having first input means for receiving start position data of said image outlines and second input means for receiving end position data of said image outlines;

an outline start position memory connected to said first input means for storing the start position data of the image outlines in scanning lines; and an outline end position memory connected to said second input means for storing the end position data of the image outlines in scanning lines; and filling means for filling a region of the scanning line, the region comprising positions in which the output status of the controllable arithmetic means has a value of the one direction.

2. An image signal processing system as set forth in claim 1, wherein the controllable arithmetic means comprises an addition-subtraction means for performing an addition operation when the scanning position is coincident with the start position of the image outlines and performing a subtraction operation when the scanning position is coincident with the end position of the image outlines.

3. An image signal processing system as set forth in claim 2, wherein the addition-subtraction means comprises a latch circuit and a plurality of adder-subtracters each performing the addition operation when the scanning position is coincident with the start position of the image outlines and performing the subtraction operation when the scanning position is coincident with the end position of the image outlines, the plurality of adder-subtracters being cascade-connected and respectively corresponding to data bits of the scanning line, output terminals of the last adder-subtracter being connected to input terminals of the latch circuit, output terminals of the latch circuit being connected to input terminals of the first adder-subtracter, and the output status comprising output values of the plurality of adder-subtracters.

4. An image signal processing system as set forth in claim 3, wherein the number of data bits of any scanning line is a multiple of the number of the adder-subtracters.

5. An image signal processing system as set forth in claim 1, wherein the controllable arithmetic means comprises an addition-subtraction means for performing an addition operation when the scanning position is coincident with the start position of the image outlines and performing a subtraction operation when the scanning position is coincident with the end position of the image outlines.

6. An image signal processing system as set forth in claim 5, wherein the addition-subtraction means comprises a latch circuit and a plurality of adder-subtracters each performing the addition operation when the scanning position is coincident with the start position of the image outlines and performing the subtraction operation when the scanning position is coincident with an end position of the image outlines, the plurality of adder-subtracters being cascade-connected and respectively corresponding to data bits of the scanning line, output terminals of the last adder-subtracter being connected to input terminals of the latch circuit, output terminals of the latch circuit being connected to input terminals of the first adder-subtracter, and the output status comprising output values of the plurality of adder-subtracters.

7. An image signal processing system as set forth in claim 6, wherein the number of data bits of any scanning line is a multiple of the number of the adder-subtracters.

8. An image signal processing system as set forth in claim 6, wherein the outline start position memory stores the start position data comprising data bits of the number equal to that of the adder-subtracters, the outline end position memory stores the end position data comprising data bits of the number equal to that of the adder-subtracters, the respective data bits of the start position data are input to addition control terminals of the adder-subtracters, and the respective data bits of the end position data are input to subtraction control terminals of the adder-subtracters.

9. An image signal processing system as set forth in claim 8, wherein the number of data bits of any scanning line is a multiple of the number of the adder-subtracters.

10. An image signal processing method for filling the insides of image outlines, the method comprising the steps of:

storing start position data of image outlines in scanning lines in an outline start position memory;

storing end position data of image outlines in scanning lines in an outline end position memory;

changing a control status in one of a positive direction and a negative direction when a scanning position is coincident with a start position of the image outlines;

changing the control status in the opposite direction when the scanning position is coincident with an end position of the image outlines; and filling a region of the scanning line, the region comprising positions in which the control status has a value of the one direction.

11. An image signal processing method as set forth in claim 10, wherein the control status is changed in the positive direction when the scanning position is coincident with the start position of the image outlines and is changed in the negative direction when the scanning position is coincident with the end position of the image outlines.

* * * * *